United States Patent
Sandell

[19]

[11] Patent Number: 6,066,211
[45] Date of Patent: May 23, 2000

[54] BATTERY-POWERED ELECTRIC VACUUM CLEANER SYSTEM

[75] Inventor: Michael W. Sandell, Valparaiso, Ind.

[73] Assignee: The Servicemaster Company, Downers Grove, Ill.

[21] Appl. No.: 09/197,401

[22] Filed: Nov. 20, 1998

[51] Int. Cl.[7] ...................................................... A47L 5/24
[52] U.S. Cl. .............................. 134/21; 15/327.5; 15/339; 15/344
[58] Field of Search ..................... 15/327.5, 339, 15/344; 134/21; 224/902, 930

[56] References Cited

U.S. PATENT DOCUMENTS

| | | | |
|---|---|---|---|
| D. 278,386 | 4/1985 | Share | 224/902 |
| 1,047,164 | 12/1912 | Butenschoen | 15/327.5 |
| 2,190,601 | 2/1940 | La Van | 224/902 |
| 3,695,006 | 10/1972 | Valbona et al. | 15/344 |
| 3,919,615 | 11/1975 | Niecke | 224/929 |
| 4,011,624 | 3/1977 | Proett . | |
| 4,429,432 | 2/1984 | Copeland et al. . | |
| 4,476,607 | 10/1984 | Ross | 15/339 |
| 4,577,365 | 3/1986 | Yuen . | |
| 4,610,048 | 9/1986 | Ishihara et al. . | |
| 4,841,594 | 6/1989 | Elson et al. . | |
| 4,884,314 | 12/1989 | Miner et al. . | |
| 4,899,418 | 2/1990 | Steiner et al. . | |
| 4,918,857 | 4/1990 | Wade et al. . | |
| 4,932,098 | 6/1990 | Haines . | |
| 4,939,810 | 7/1990 | Ataka . | |
| 4,945,604 | 8/1990 | Miner et al. . | |
| 4,967,443 | 11/1990 | Krasznai et al. . | |
| 5,500,978 | 3/1996 | Levine . | |
| 5,561,885 | 10/1996 | Zahurance et al. . | |
| 5,604,953 | 2/1997 | Castwell et al. . | |
| 5,617,610 | 4/1997 | Dearaujo . | |
| 5,680,026 | 10/1997 | Lueschen | 224/902 |

*Primary Examiner*—Terrence R. Till
*Attorney, Agent, or Firm*—Banner & Witcoff, Ltd.

[57] ABSTRACT

A battery-powered electric vacuum cleaner system including: a 12-volt battery other than a Nickel Cadmium battery; a belt and pouch for hands-free carrying of the 12-volt battery; a charger for charging the battery, the charger being capable of outputting substantially more than 2 amps; and a battery-powered electric vacuum cleaner. The battery-powered electric vacuum cleaner having an elongated substantially cylindrical hollow extension wand, which allows a person standing upright to clean a floor with the vacuum cleaner.

14 Claims, 4 Drawing Sheets

BATTERY-POWERED ELECTRIC VACUUM CLEANER SYSTEM

BACKGROUND OF THE INVENTION

1. Field of the Invention

This invention relates generally to portable vacuum cleaners, and more particularly to a powerful, light-weight, and rugged portable, battery-powered vacuum cleaner.

2. Related Art

The DUSTBUSTER from Black & Decker produces insufficient suction power for many cleaning tasks and typically can not be used conveniently to vacuum floors from a standing position.

Units such as Eureka's BOSS LITE include a powered brush, which improves pick-up, but such units are typically undesirably fragile and, like a DUSTBUSTER, such units typically have insufficient suction power for many cleaning tasks.

Other portable vacuums, such as Black & Decker's SV 2000 upright, lose suction power undesirably quickly as their filters become dirty, and their small throats are susceptible to clogging.

In addition, prior art portable vacuum cleaners typically use nickel-cadmium batteries and re-chargers. Nickel cadmium batteries are expensive and have a tendency to develop a "memory" such that even if the battery is capable of providing twenty minutes of run time, if it is continually used for only five minutes and then recharged, the battery will eventually become capable of running for only five minutes. Further, prior art vacuums using Nickel cadmium batteries typically provide an undesirably limited amount of run time before the battery becomes drained and needs to be recharged.

SUMMARY OF THE INVENTION

It is therefore an object of this invention to provide a light-weight, powerful, easily maneuvered, battery-powered portable vacuum cleaner that overcomes the problems in the prior art mentioned above. It is an additional object of this invention to provide a battery-powered hand-held vacuum cleaner providing sufficient suction power for industrial applications, such as aircraft cabin cleaning, coach or bus cleaning, cleaning of stairwells, lobbies, and other areas in which the use of an electrical extension cord could be unsafe or impractical or both.

This invention includes: a battery-powered electric vacuum cleaner system including: a 12-volt battery other than a Nickel Cadmium battery; a belt and pouch for hands-free carrying of the 12-volt battery; a charger for charging the battery, the charger being capable of outputting substantially more than 2 amps; and a battery-powered electric vacuum cleaner. The battery-powered electric vacuum cleaner has an elongated substantially cylindrical hollow extension wand, which allows a person standing upright to clean a floor with the vacuum cleaner. Additional batteries and/or chargers could be used to provide virtually continuous operation of the vacuum cleaner.

DETAILED DESCRIPTION OF THE PREFERRED EMBODIMENT

Figure 1:
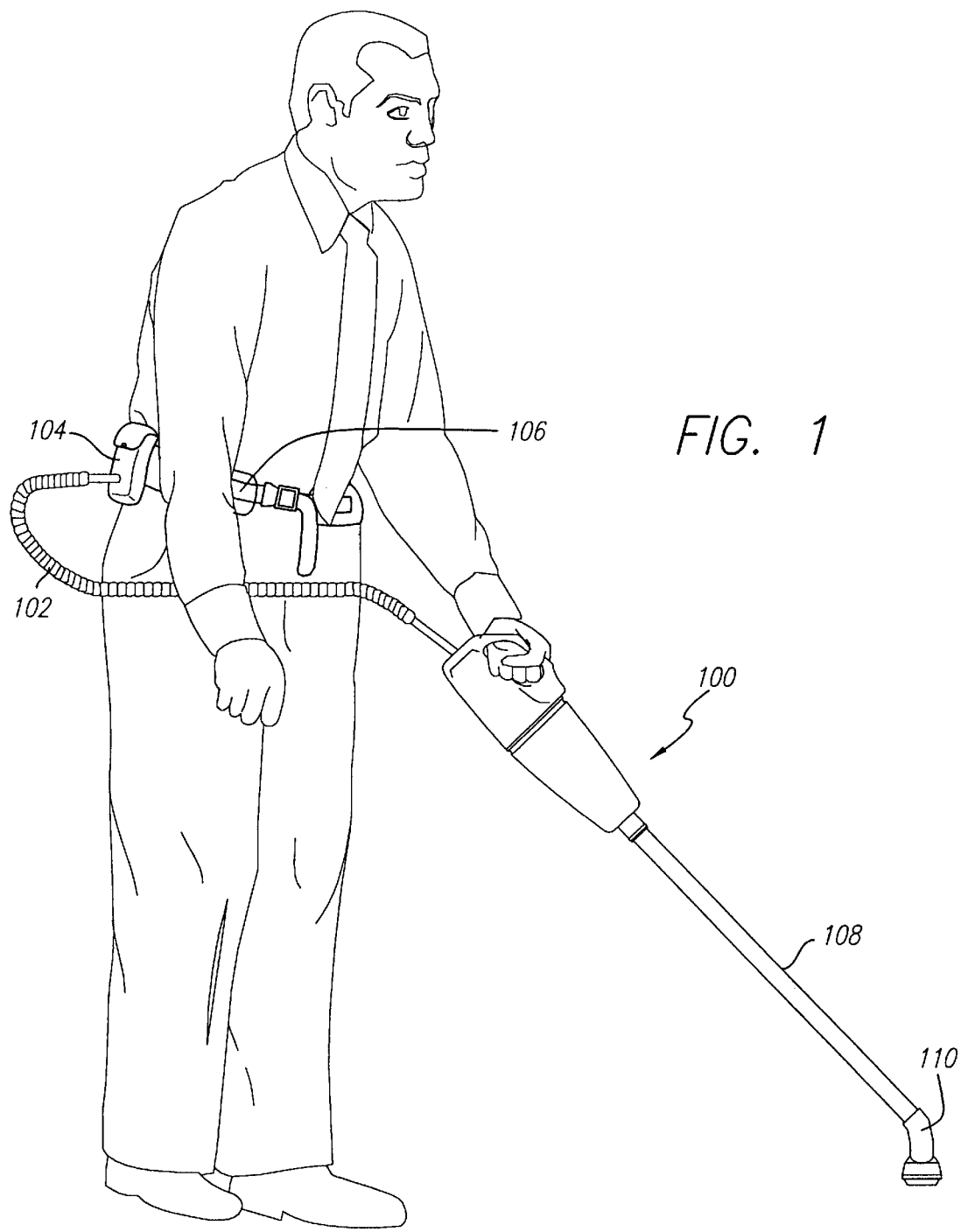
FIG. 1 shows a person standing upright and using a battery-powered vacuum according to this invention.

FIG. 1 shows a person standing upright and using battery-powered electric vacuum cleaner 100. Battery-powered electric vacuum cleaner 100 is electrically coupled via power cord 102 to a 12-volt battery, not shown in FIG. 1. The 12-volt battery is located inside pouch 104, which is attached to belt 106. Power cord 102 could be a coiled power cord, similar to a coiled telephone handset cord, to prevent cord 102 from becoming entangled or looped around obstructions, such as the arm of a chair in an aircraft cabin, while vacuum cleaner 100 is being used. As will be apparent to those skilled in the art, vacuum cleaner 100 could be electrically coupled to the 12-volt battery in other suitable ways. Further, as will be apparent to those having ordinary skill in the art batteries having a different suitable voltage could also be used without departing from the scope of this invention.

Extension wand 108 and floor tool 110 allow a user of vacuum cleaner 1 00 to clean floors from a standing position. Extension wand 108 could be cylindrical, approximately 24 inches long, have an inner diameter of approximately 1.25 inches and be made of chrome-plated steel. Extension wand 108 having an inner diameter of approximately 1.25 inches, which is an industry standard for non-battery-powered vacuum cleaners, allows battery powered vacuum cleaner 100 to provide improved pickup relative to other battery-powered vacuum cleaners. Floor tool 110 could be approximately 5 inches wide and adapted to clean several types of surfaces. As will be apparent to those skilled in the art, extension wands and floor tools having other suitable dimensions and/or made from other suitable material could also be used without departing from the scope of this invention.

Figure 2:
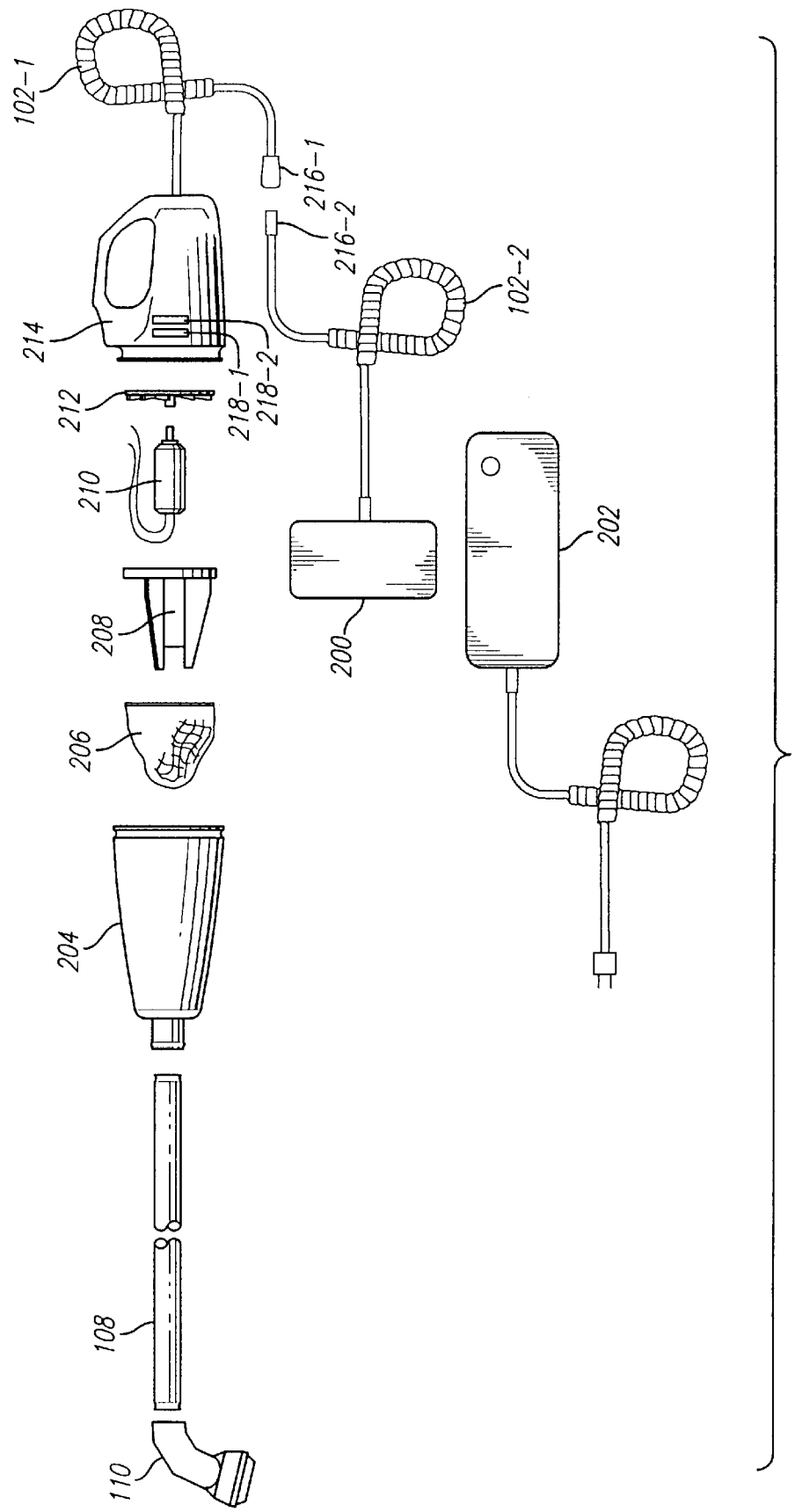
FIG. 2 is an exploded view of the components of the portable battery-powered vacuum cleaner, the battery, and the battery recharger.

FIG. 2 is an exploded view of the components of portable battery-powered vacuum cleaner 100, battery 200, and battery recharger 202. Power cord 102 is shown in more detail in FIG. 2 than in FIG. 1. As shown in FIG. 2, power cord 102 comprises first and second halves, 102-1 and 102-2, that can be connected by two-piece snap connector 216-1 and 216-2, such as a positive-lock, nylon housing connector manufactured by Molex.

Vacuum cleaner 100 comprises floor tool 110, extension wand 108, front body housing 204, filter 206, motor housing 208, 12-volt electric motor 210, fan 212, and rear housing 214. Floor tool 110, extension wand 108, and front body housing 204 are oriented with respect to each other as shown in FIG. 2. Filter 206 is removably inserted into front body housing 204. Twelve-volt motor 210 is contained inside motor housing 208. Fan 212 is operatively attached to motor 210 such that when motor 210 is energized and front body housing 204 is attached to rear housing 214, fan 212 causes an airstream to be sucked through floor tool 110, extension wand 108, front housing 204, and filter 206, which causes particulate matter in the air stream to be trapped in front housing 204. Fan 212 is positioned inside rear housing 214, and the airstream generated by fan 212 is diffused through slots 218-1 and 218-2 in rear housing 214. Front housing 204, filter 206, motor housing 208, motor 210, fan 212, and rear housing 214 (core vacuum cleaner unit) can be purchased pre-assembled from Target stores. Target's stock number for the core vacuum cleaner unit is 90920 30454. The core vacuum cleaner unit is a handheld, DC-powered, single stage unit. Motor 210 is a 12-volt, can-type, permanent magnet, 96 watt unit. As will be apparent to those skilled in the art, other portable electric vacuum cleaner units could also be used without departing from the scope of this invention. 20 Battery 200 could be a Yuasa NP7-12, lead-acid sealed gel-cell, 7 amp-hour battery, 12-volt battery that weighs approximately 6 pounds. Such a battery typically provides approximately 30 minutes of run-time for the core vacuum cleaner unit described above. As will be apparent to those skilled in the art, other suitable batteries could also be used without departing from the scope of this invention.

Battery charger 202 could be a charger manufactured by Bestec that outputs approximately 2.5 amps at 12 volts DC. Such a charger returns the Yuasa battery described above to a filly charged state in approximately 3 hours, as opposed to the 8–12 hour charging time required by more common 1-amp "trickle" chargers. As will be apparent to those skilled in the art, other suitable battery chargers could also be used without departing from the scope of this invention.

By using one or more additional batteries and, optionally, one or more additional chargers to charge the one or more additional batteries, virtually continuous operation of vacuum cleaner 100 is possible. For instance, if each battery provides 30 minutes of run time and takes 3 hours to recharge, six chargers would be capable of returning one of the seven batteries to full charge every thrity minutes as desired. As will be apparent to those skilled in the art, other permutations and combinations of numbers of batteries and chargers could also be used without departing from the scope of this invention.

Figure 3:
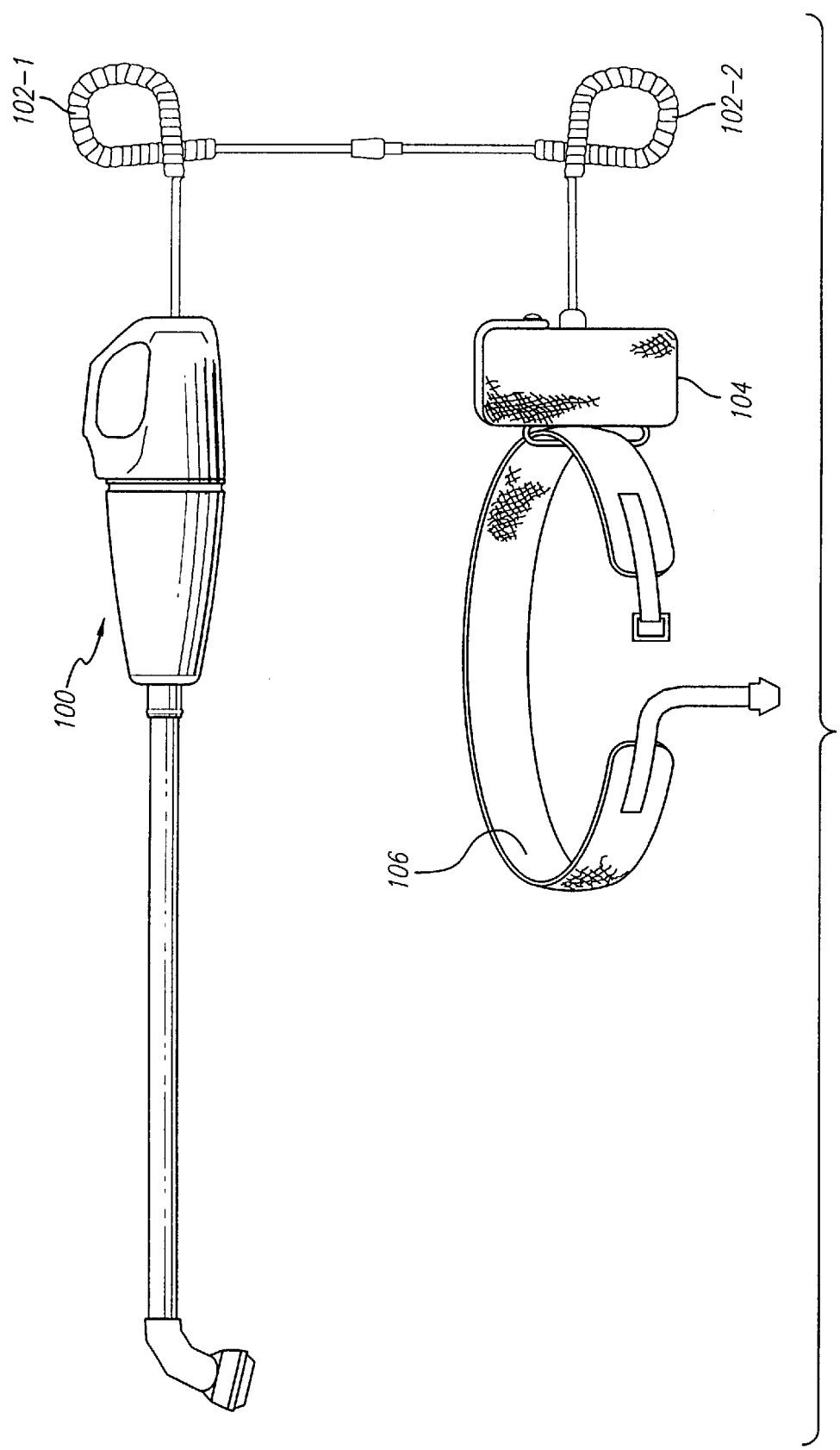
FIG. 3 shows the battery compartment attached to a belt and the power cord connecting the battery and the vacuum cleaner.
Figure 4:
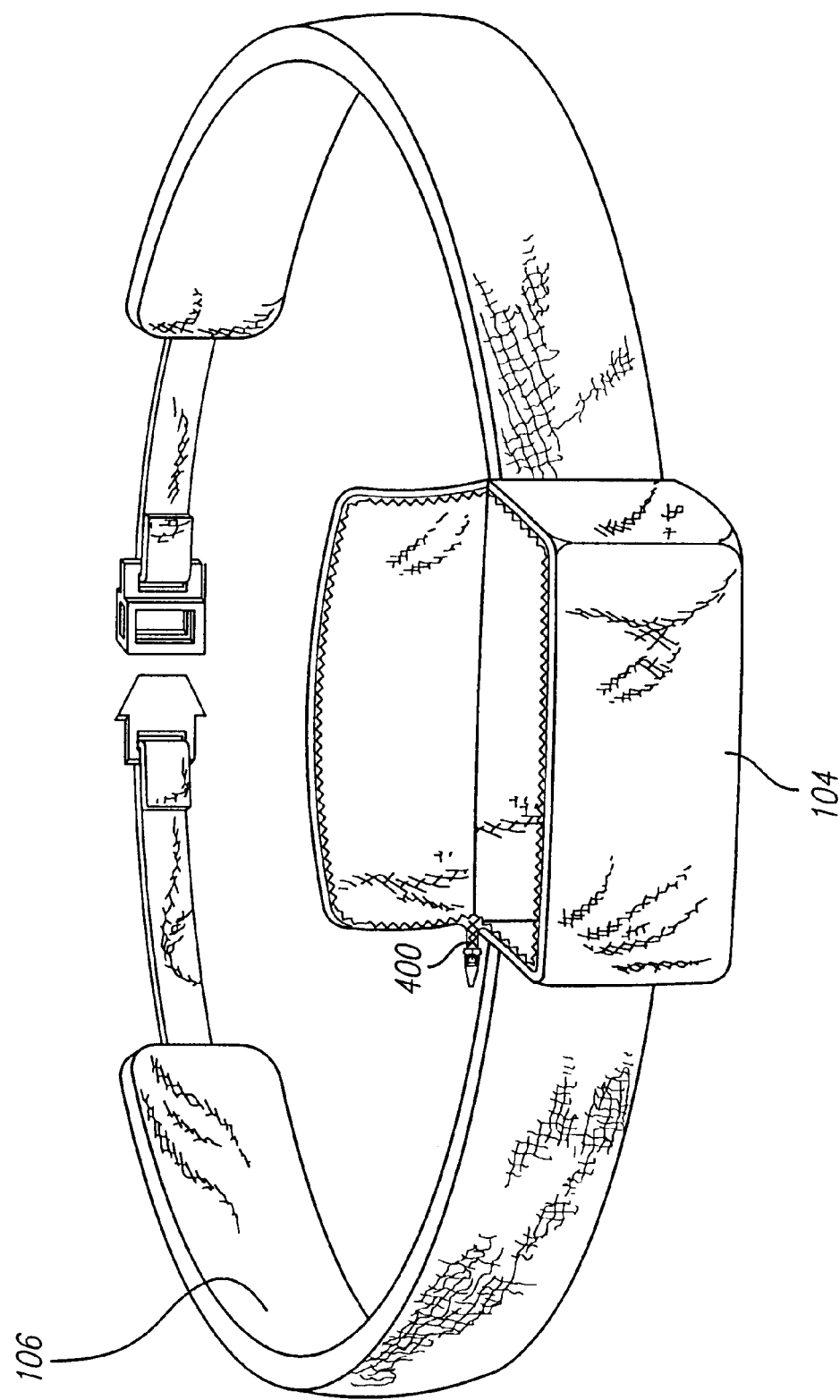
FIG. 4 shows a belt with a zippered pouch for carrying the battery.

FIG. 3 shows battery pouch 104 attached to belt 106. Battery pouch 104 contains battery 200 (not shown in FIG. 3) which is coupled to vacuum cleaner 100 by power cord halves 102-1 and 102-2, which are connected to each other, as previuosly described. FIG. 4 shows belt 106 with pouch 104 having zipper 400 for opening and closing pouch 104. As will be apparent to those having ordinary skill in the art, a shoulder strap, knapsack, or other suitable arrangement for hands-free carrying of battery 200 could also be used without departing from the scope of this invention.

This invention has been described with reference to a preferred embodiment. Modifications may occur to others upon reading and understanding the foregoing detailed description. This invention includes all such modifications to the extent that they come within the scope of the appended claims or their equivalents.

What is claimed is:

1. A battery-powered electric vacuum cleaner system, comprising:
    a 12-volt battery other than a Nickel Cadmium battery;
    means for hands-free carrying of the 12-volt battery;
    a charger for charging the battery, the charger being capable of outputting substantially more than 2 amps; and
    a battery-powered electric vacuum cleaner including:
        a front body housing for retaining dirt picked up by the cleaner, the front body housing containing a 12-volt D.C. motor, the motor being electrically coupled to the battery,
        a rear housing containing a fan, the fan being operatively connected to the motor, the rear housing being removably attached to the rear of the front body housing,
        a filter removably inserted into the front body housing for removing dirt from the air stream produced by the fan,
        an elongated substantially cylindrical hollow extension wand having a first end attached to the front end of the front body housing, and
        a floor tool attached to a second end of the extension wand for contacting surfaces to be cleaned by the cleaner such that a person can clean a floor with the vacuum cleaner while the person is standing upright.

2. The system as in claim 1, further comprising: at least one additional 12-volt battery other than a Nickel Cadmium battery.

3. The system as in claim 2, further comprising: at least one additional charger capable of outputting substantially more than 2 amps.

4. The system as in claim 1 wherein the means for hands-free carrying of the 12-volt battery comprises a belt and a pouch for carrying the battery.

5. The system as in claim 1 wherein the battery is a lead-acid sealed gel-cell battery.

6. The system as in claim 5 wherein the battery has a capacity of substantially greater than 5 amp-hours.

7. The system as in claim 1 wherein the motor is a can-type permanent magnet 96-watt motor.

8. The system as in claim 1 wherein the wand is rigid, at least 18 inches long, and is made of chrome-plated steel.

9. A method for using a portable battery-powered vacuum cleaner, comprising the steps of:
    charging a 12-volt battery other than a Nickel Cadmium battery with a charger capable of outputting substantially more than 2 amps;
    carrying the 12-volt battery in a hands-free manner;
    coupling the battery to an electric vacuum cleaner, the vacuum cleaner including a 12-volt DC motor and an extension wand;
    energizing the motor; and
    vacuuming a floor from an upright standing position using the portable battery-powered vacuum cleaner.

10. The method of claim 9 further comprising the steps of:
    uncoupling the battery from the electric vacuum cleaner; and
    coupling one or more additional 12-volt batteries, one at a time, other than Nickel Cadmium batteries, to the electric vacuum cleaner.

11. The method of claim 10 further comprising the step of: using one or more additional battery chargers capable of outputting substantially more than 2 amps to charge the one or more additional batteries.

12. A portable battery-powered vacuum cleaner system, comprising:

means for charging a 12-volt battery other than a Nickel Cadmium battery with a charger capable of outputting substantially more than 2 amps;

means for carrying the 12-volt battery in a hands-free manner;

means for coupling the battery to an electric vacuum cleaner, the vacuum cleaner including a 12-volt DC motor and an extension wand; and means for energizing the motor so that a person can clean a floor with the portable battery-powered vacuum cleaner while the person is standing upright.

13. The portable battery-powered vacuum cleaner system of claim 12, further comprising:

means for uncoupling the battery from the electric vacuum cleaner and for coupling one or more additional 12-volt batteries, one at a time, other than Nickel Cadmium batteries, to the electric vacuum cleaner.

14. The portable battery-powered vacuum cleaner system of claim 13, further comprising:

means for using one or more additional battery chargers capable of outputting substantially more than 2 amps to charge the one or more additional batteries.

* * * * *